United States Patent
Martin et al.

(10) Patent No.: US 11,565,667 B1
(45) Date of Patent: Jan. 31, 2023

(54) AUTOMATIC BRAKE PEDAL CONTROL

(71) Applicant: Ford Global Technologies, LLC, Dearborn, MI (US)

(72) Inventors: Douglas Raymond Martin, Canton, MI (US); Matthew Walton, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/590,109

(22) Filed: Feb. 1, 2022

(51) Int. Cl.
*B60T 7/04* (2006.01)
*B60T 7/06* (2006.01)
*G05G 1/40* (2008.04)

(52) U.S. Cl.
CPC .............. *B60T 7/06* (2013.01); *B60T 7/04* (2013.01); *G05G 1/40* (2013.01)

(58) Field of Classification Search
CPC .... B60T 7/04; B60T 7/06; G05G 1/40; G05G 1/405; B60K 2026/022; B60K 2026/023; B60K 2026/026
See application file for complete search history.

(56) References Cited

U.S. PATENT DOCUMENTS

| | | | |
|---|---|---|---|
| 9,296,368 B2 | 3/2016 | O'Leary et al. | |
| 2004/0251095 A1* | 12/2004 | Simard | B60T 13/586 188/1.11 E |
| 2006/0212207 A1 | 9/2006 | Sugano et al. | |
| 2017/0217312 A1* | 8/2017 | Schweinfurth | F02D 11/02 |

FOREIGN PATENT DOCUMENTS

| | | |
|---|---|---|
| JP | 5685759 B2 | 3/2015 |
| JP | 5867433 B2 | 2/2016 |
| JP | 2016172477 A * | 9/2016 |
| WO | WO-2018168124 A1 * | 9/2018 |

OTHER PUBLICATIONS

Machine Translation of JP 2016-172477.*
Machine Translation of WO 2018/168124.*

* cited by examiner

*Primary Examiner* — Brian J McGovern
(74) *Attorney, Agent, or Firm* — Lorne Forsythe; Brooks Kushman P.C.

(57) ABSTRACT

A vehicle has a braking system including a brake pedal and a controller. The controller may cause the brake pedal to move to a predetermined position responsive to automatic application of braking torque by the braking system. The controller may further implement an update such that the predetermined position corresponds to zero braking torque.

19 Claims, 2 Drawing Sheets

AUTOMATIC BRAKE PEDAL CONTROL

TECHNICAL FIELD

This disclosure relates to vehicle brake systems and controls strategies associated therewith.

BACKGROUND

A cruise control mode of a vehicle may maintain a speed of the vehicle without the driver pressing the accelerator pedal, and reduce a speed of the vehicle without the driver pressing the brake pedal.

SUMMARY

A brake system includes a brake pedal having an initial zero position corresponding to zero braking torque, and a controller that, responsive to automatic application of braking torque, causes the brake pedal to move from the initial zero position to a predetermined position, and implements an update such that the predetermined position corresponds to zero braking torque.

A method includes moving a brake pedal to a predetermined position based on an amount of braking torque being automatically applied, and implementing an update such that the predetermined position corresponds to zero braking torque responsive to indication that the brake pedal is unable to return to an initial zero position from the predetermined position.

A vehicle includes a braking system having a brake pedal and a controller that causes the brake pedal to move to a predetermined position responsive to automatic application of braking torque by the braking system.

DETAILED DESCRIPTION

Figure 1A:
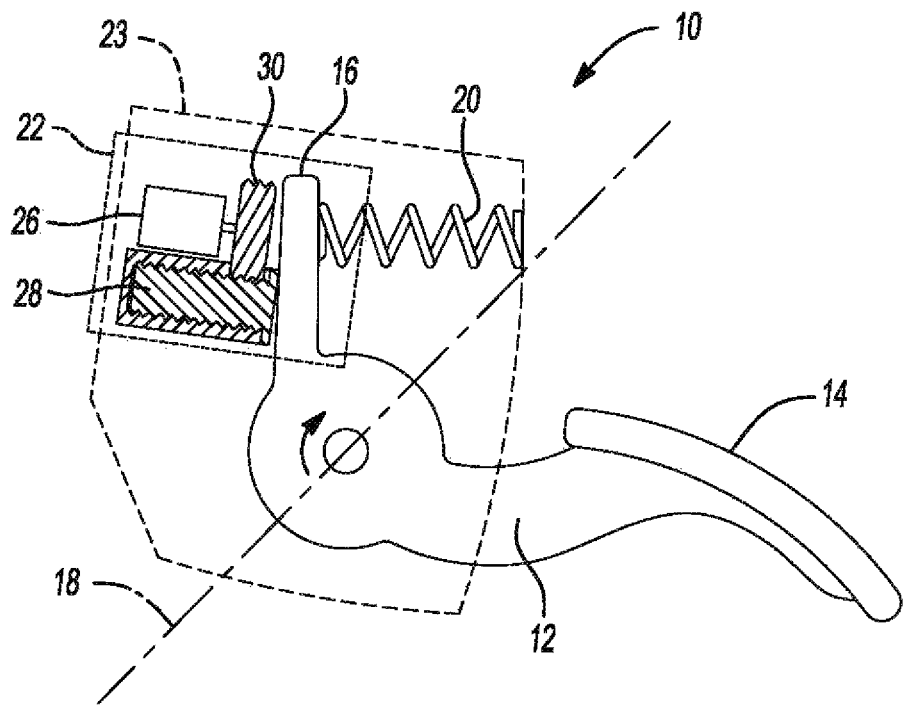
FIGS. 1A and 1B are schematic diagrams of a brake pedal assembly.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Before introduction of adaptive cruise control (ACC), brake actuation was typically consistent. Depressing the brake pedal a certain amount gave a predictable slowing. Certain of today's ACC systems do not provide pedal feedback that the system is braking, as they are electronically controlled, and therefore further depressing the brake pedal during ACC braking may result in unexpected slowing.

Motorized feedback to the brake pedal based on the braking position that would achieve the braking being done by ACC is thus proposed. To accomplish this, a servo/stepper motor may push on the brake pedal to adjust its position. The servo motor may be attached to the pedal in such a way that it does not inhibit driver input. In one example, the servo motor drives a worm gear on one end of a fulcrum and pushes the pedal to its desired position. This worm gear can act as a movable stop screw. When user input is provided, the pedal pulls away from the stop screw, permitting slowing beyond cruise control.

If ACC is enabled and automatic braking is taking place, the brake pedal position is adjusted to match the braking action being performed by the ACC. The desired pedal position may be found by mapping braking torque onto brake pedal position. This is the inverse of the normal process of mapping pedal position to desired braking force. The same pedal map table may be used with an inverse-lookup to determine desired pedal position.

The pedal may be adjusted to the desired position by sending a signal to the servo motor and comparing actual pedal position data against the desired pedal position using a closed loop controller or open loop controller (e.g., stepper motor). The actual pedal position data may be used as feedback data. When the pedal position's mapped braking torque value is a percentage (e.g., 2%, 4%, etc.) lower than the torque value held by the ACC, the pedal position is properly placed. This prevents unintended slowing by keeping the pedal in the non-response zone, unless pressed by the driver.

With an adjustable hard-stop, the pedal may stick if the servo/screw experiences certain issues. Sensors and adjustments can be made to accommodate this. A Hall-effect or laser measuring distance may be attached to face the back side of the screw. If, for example, the desired set screw position is more than 1 mm from the desired position for more than 1.0 seconds, an error may be set and a command sent to the servo to fully retract the stop screw. If the set screw does not retract fully, then a stuck error may be set, the zero brake pedal position may be set to the stuck position, and ACC may be disabled.

By attaching the servo to create an adjustable hard stop for pedal return during ACC braking, user input for further slowing is not inhibited. By positioning the pedal to not exceed the pedal position corresponding to ACC braking torque, no unintended braking is introduced into the system. In this way, driver braking feel during ACC braking is improved by eliminating the unexpected increase in braking in ACC systems.

Referring to FIG. 1A (unactuated) and 1B (actuated), a brake pedal assembly 10 includes a brake pedal 12 having a proximal end 14 and a distal end 16. The proximal end 14 is configured to receive input from a driver. The distal end 16 is spaced from and may be angularly disposed apart from the proximal end 14. The distal end 16 may be configured to receive a limiting force and a biasing force as described below. The biasing force may act to actuate or move the brake pedal assembly 10 to a desired position. The brake pedal assembly 10 defines a rotational axis 18. Both of the proximal end 14 and distal end 16 are disposed radially outward from the rotational axis 18, and rotate relative to the rotational axis 18.

The brake pedal assembly 10 may have a biasing member 20 such as a return spring disposed between the brake pedal assembly 10 and a vehicle chassis or other support structure. The return spring 20 may apply a biasing force on the distal end 16 such that upon release of the proximal end 14, the brake pedal assembly 10 returns to its unpressed position (FIG. 1A).

The brake pedal assembly 10 also has a limit assembly 22 and a housing 23. The limit assembly 22 includes a pedal limit 24 and a limit motor 26. The limit motor 26 may be an electric motor with a rotating output shaft, or alternatively, may be a linear or other actuator. The limit motor 26 is configured to receive input from a vehicle controller, and as described below, upon receiving a signal indicative of an actuation request, the limit motor 26 is activated and controlled to move the pedal limit 24 to a selected position. The limit motor 26 may move the pedal limit 24 towards and away from the brake pedal 12. In some embodiments, activation of the limit motor 26 may include rotational actuation of an output shaft. In this embodiment, the pedal limit 24 defines a worm or worm shaft 28, and the limit motor 26 defines a worm gear 30. The worm gear 30 drives the worm shaft 28 to translate the pedal limit 24. The worm gear 30 and worm shaft 28 are in meshed engagement, such that rotation of the worm gear 30 induces rotation of the worm shaft 28, and translation of the pedal limit 24.

Figure 1B:
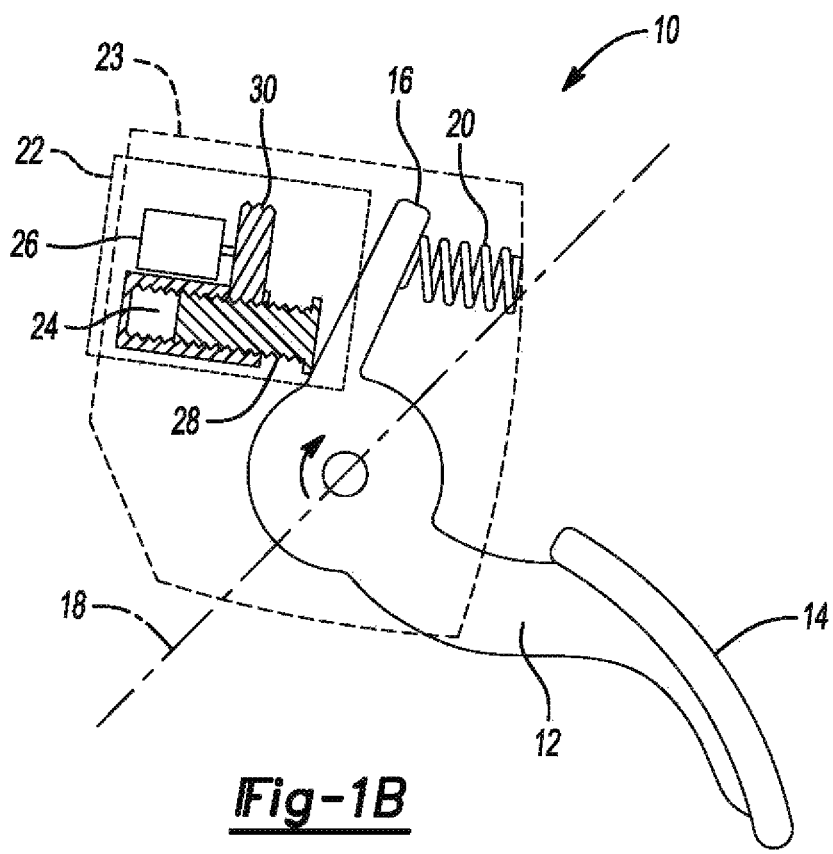

The pedal limit 24 is configured to inhibit movement of the accelerator pedal 12 in the first direction. To achieve actuation limiting, the pedal limit 24 may be configured to traverse to a plurality of positions within the range of brake pedal positions. In at least one of the plurality of positions, movement of the brake pedal 12 is restricted due to the brake pedal 12 abutting the pedal limit 24 (FIG. 1B). In at least one position, the brake pedal 12 may not be restricted by the pedal limit 24. The pedal limit 24 may be configured to restrict actuation of the brake pedal 12 in a first direction. In one example, the pedal limit 24 is moved to a position at 50% travel between the first and second positions of the brake pedal 12. The brake pedal 12 may move from the 50% travel location towards the second position, and is restricted or inhibited from moving from the 50% travel location back to the first position by the pedal limit 24 until the pedal limit 24 is moved or retracted. The biasing member 20 continues to exert a biasing force on the brake pedal 12 such that the brake pedal 12 engages or contacts the pedal limit 24 when it is deployed as it is compressed between the distal end 16 and housing 23.

Figure 2:
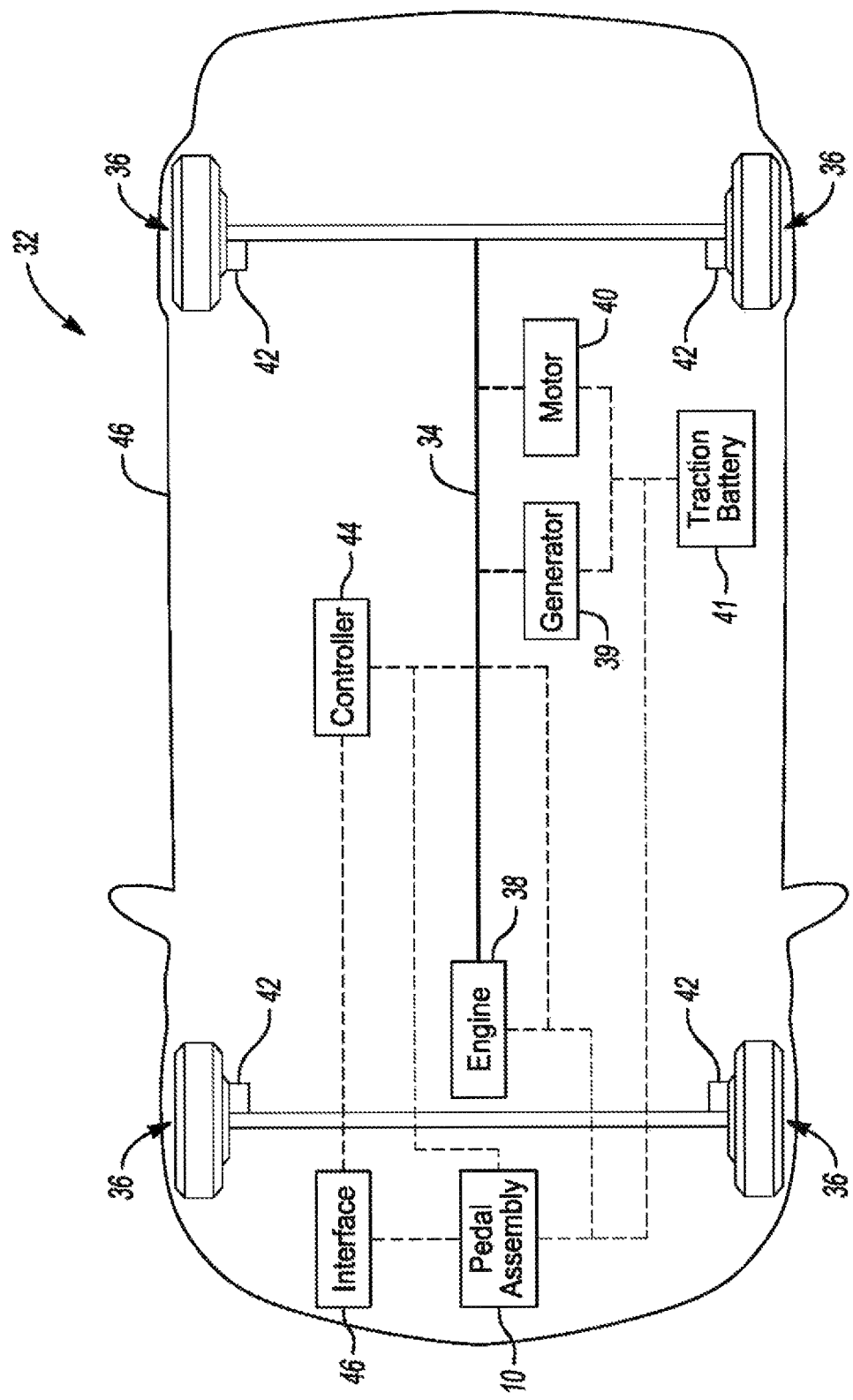
FIG. 2 is a schematic diagram of a vehicle.

Referring to FIG. 2, a vehicle 32 has a drivetrain 34 that rotatably couples the prime mover(s) of the vehicle 32 to a plurality of wheels 36. The drivetrain 34 may include a transmission, as well as other torque transfer devices. The vehicle 32 has an engine used to output and provide torque to the wheels 36 via the drivetrain 34. In one example, the engine 38 is an internal combustion engine. In other embodiments, the engine 38 may be a diesel engine. The vehicle 32 may additionally or alternatively have a generator 39 and a motor 40 coupled with the drivetrain 34.

The vehicle 32 has a vehicle battery 41 used to store electrical energy. Further, the motor 40 may be used to convert the stored electrical energy into mechanical energy to propel the vehicle 32 in a hybrid or electric configuration.

The vehicle 32 includes the brake pedal assembly 10. The brake pedal assembly 10 is in communication with the generator 39 and brakes 42. Driver input to the brake pedal assembly 10, and the location of the brake pedal 12 relative to the first and second positions for the brake pedal 12, may cause the generator 39 and/or brakes 42 to apply more or less braking torque to the vehicle 32 via the controller 44.

The vehicle 32 has a vehicle chassis 46 that defines a vehicle interior. The vehicle chassis 46 is configured to at least partially support the brake pedal 12 of the brake pedal assembly 10.

Various components of the vehicle 32, including the generator 39, vehicle battery 41, and the brake pedal assembly 10, are in communication with the controller 44 or control system. The controller 44 may be provided as one or more controllers or control modules for the various vehicle components and systems. The controller 44 and control system for the vehicle 32 may include any number of controllers, and may be integrated into a single controller, or have various modules. Some or all of the controllers may be connected by a controller area network (CAN) or other system. It is recognized that any controller, circuit, or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

The vehicle 32 has a control interface 46 configured to allow the driver to communicate with the controller 44. In some embodiments, the control interface 46 is a vehicle dashboard. In other embodiments, the control interface 46 is one of an infotainment system and an interactive steering wheel.

The controller 44 contains a cruise control method. The cruise control method allows the vehicle 32 to maintain a desired speed without input to the accelerator pedal. In at least one embodiment, a driver sets the desired speed and requests the vehicle 32 be placed in cruise control using a cruise control input on the control interface 46. The cruise control input may be a button, switch, or other input in the vehicle interior. The cruise control input may include a set function, a cancel function, a resume function, a speed increase function, and a speed decrease function. The cruise control input maybe executed with the control interface 46. In this embodiment, the controller 44 accepts the speed of the vehicle 32 as the desired speed, for example, when the set function on the cruise control input is activated by the driver. In another embodiment, the controller 44 receives input from the driver indicative of a desired speed via the control interface 46 via the set function. The controller 44 is also configured to terminate the cruise control method via the cancel function. The controller 44 may be configured to terminate the cruise control method in response to driver input indicative of speed reduction, such as depression of the brake pedal 12. Additionally, or alternatively, the controller 44 may be configured to terminate the cruise control method in response to a vehicle component independently requesting termination of the method, such as adaptive cruise control or other advanced driver assistance systems (ADAS).

The controller 44 is configured to control actuation of the pedal limit 24. The controller 44 is configured to send signals indicative of activation to the limit motor 26. The signals may be indicative of a limit position, speed, direction, and/or holding strength. In one embodiment, the controller 44 includes a braking torque to brake pedal position schedule. Based on the amount of braking torque automatically applied during adaptive cruise control, the controller 44 can determine the corresponding position for the brake pedal 12. Activation of the limit motor 26 via the controller 44 will cause the worm shaft 28 to move toward the distal end 16 to adjust the position of the proximal end 14. That is, the brake pedal position will reflect the amount of braking torque being applied automatically such that a feel of the brake pedal 12 and its position will be more natural if a driver attempts to further press the brake pedal 12 to further brake the vehicle 32.

FIG. 1B shows the worm shaft 28 extending to the right and in contact with the distal end 16, which has the effect of depressing the proximal end 14 as if a driver had stepped on the brake pedal 12. If instead the worm shaft 28 were retracted left such that it no longer displaces the distal end 16, the biasing member 20 would push the distal end 16 to the left, which would have the effect of returning the proximal end 14 to its initial (unpressed) position, as shown in FIG. 1A.

Assuming for the purposes of discussion, the generator 39 and/or brakes 42 are configured to produce a maximum of 100 units of braking torque, and the brake pedal 12 is configured to achieve 100 different positions between being unpressed and being fully pressed (0 being unpressed and 100 being fully pressed), a table mapping the braking torque to brake pedal position may be constructed. In this scenario, each unit of braking torque corresponds to a corresponding brake pedal position. 0 units of braking torque would correspond to the $0^{th}$ (unpressed) brake pedal position. 50 units of braking torque would correspond to the $50^{th}$ brake pedal position. And, 100 units of braking torque would correspond to the $100^{th}$ (fully pressed) brake pedal position. If 40 units of braking torque were automatically applied by for example an ACC system, the controller 44 could consult the table and determine that the brake pedal 12 should be moved to the $40^{th}$ position (e.g., 40% pressed position). Activation of the limit motor 26 to move worm shaft 28 would cause the brake pedal 12 to assume the desired position.

If for some reason the worm shaft 28 were to become stuck in some extend position, the controller may recalibrate the table mapping the braking torque to brake pedal position such that the current position of the brake pedal 12 would correspond to 0 units of braking torque. Known sensors, for example, may be positioned to sense whether the worm shaft 28 moves responsive to signals to actuate the limit motor. Known sensors may also be used to directly sense a position of the brake pedal 12. If the controller 44 is generating commands to actuate the limit motor 26 and the brake pedal 12 does not move, the controller 44 may determine the limit assembly 22 is stuck.

Responsive to such determination, the controller 44 may recalibrate the table. Assuming the brake pedal 12 is stuck at the $40^{th}$ position, the available range of the brake pedal 12 is now between the $40^{th}$ position and the $100^{th}$ position. Thus, the 100 available units of braking torque that could be provided needs to be distributed among the 60 available positions. The controller 44 may map each available position with 1.67 units of braking torque such that the $50^{th}$ position now corresponds to approximately 16.5 units of braking torque (and 16.5 units of braking torque corresponds to the $50^{th}$ position), the $75^{th}$ position now corresponds to 58.5 units of braking torque (and vice versa), and so on. In this fashion, even though the brake pedal 12 cannot return to its unpressed position, a full range of braking torque can still be applied for less pedal travel.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers. For example, a controller or a plurality of controllers may be programmed to perform the operations contemplated herein, etc.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A brake system comprising:
    a brake pedal having an initial zero position corresponding to zero braking torque; and
    a controller programmed to,
        responsive to automatic application of braking torque, cause the brake pedal to move from the initial zero position to a predetermined position, and
        implement an update such that the predetermined position corresponds to zero braking torque.

2. The brake system of claim 1, wherein the predetermined position is defined by an amount of the braking torque.

3. The brake system of claim 1 further comprising an actuator configured to move the brake pedal.

4. The brake system of claim 1 further comprising a gearing assembly configured to move the brake pedal.

5. The brake system of claim 4, wherein the gearing assembly includes a worm shaft and a worm gear.

6. The brake system of claim 1, wherein the controller is further programmed to determine the predetermined position based on a look-up table mapping amounts of braking torque to positions of the brake pedal.

7. A method comprising:

moving a brake pedal to a predetermined position based on an amount of braking torque being automatically applied; and implementing an update such that the predetermined position corresponds to zero braking torque responsive to indication that the brake pedal is unable to return to an initial zero position from the predetermined position.

8. The method of claim 7, wherein the moving includes activating an actuator.

9. The method of claim 7, wherein the moving includes rotating a gear assembly.

10. The method of claim 7, wherein the moving includes rotating a worm shaft.

11. The method of claim 7 further comprising determining the predetermined position from a look-up table mapping amounts of braking torque to positions of the brake pedal.

12. A vehicle comprising:
a braking system including a brake pedal; and
a controller programmed to
cause the brake pedal to move to a predetermined position responsive to automatic application of braking torque by the braking system, and
implement an update such that the predetermined position corresponds to zero braking torque responsive to indication that the brake pedal is unable to return to an initial zero position from the predetermined position.

13. The vehicle of claim 12, wherein the controller is further programmed to determine the predetermined position based on a look-up table mapping amounts of braking torque to positions of the brake pedal.

14. The vehicle of claim 13, wherein the update is an update of the look-up table.

15. The vehicle of claim 12, wherein the predetermined position is defined by an amount of the braking torque.

16. The vehicle of claim 12, wherein the braking system further includes an actuator configured to move the brake pedal.

17. The vehicle of claim 12, wherein the braking system further includes a gearing assembly configured to move the brake pedal.

18. The vehicle of claim 17, wherein the gearing assembly includes a worm shaft.

19. The vehicle of claim 17, wherein the gearing assembly includes a worm gear.

* * * * *